United States Patent
Tournemille et al.

(10) Patent No.: US 6,945,454 B2
(45) Date of Patent: Sep. 20, 2005

(54) SMART CARD DEVICE USED AS MASS STORAGE DEVICE

(75) Inventors: Jerome Tournemille, Austin, TX (US); David Tamagno, Austin, TX (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 10/420,582

(22) Filed: Apr. 22, 2003

(65) Prior Publication Data

US 2004/0211835 A1 Oct. 28, 2004

(51) Int. Cl.[7] .................................. G06F 17/00
(52) U.S. Cl. ................ 235/375; 235/380; 235/487; 235/492
(58) Field of Search ............... 235/375, 380, 235/487, 492; 709/102, 250; 705/65, 67

(56) References Cited

U.S. PATENT DOCUMENTS

| | | | | |
|---|---|---|---|---|
| 5,847,372 | A | | 12/1998 | Kreft ........................... 235/492 |
| 6,044,349 | A | * | 3/2000 | Tolopka et al. ................. 705/1 |
| 6,102,287 | A | * | 8/2000 | Matyas, Jr. ................... 235/380 |
| 6,168,077 | B1 | * | 1/2001 | Gray et al. ................... 235/375 |
| 6,236,981 | B1 | * | 5/2001 | Hill ............................... 705/67 |
| 6,311,294 | B1 | * | 10/2001 | Larky et al. ................... 714/44 |
| 6,439,464 | B1 | | 8/2002 | Fruhauf et al. .............. 235/492 |
| 6,549,951 | B1 | * | 4/2003 | Hui et al. .................... 709/250 |
| 6,665,709 | B1 | * | 12/2003 | Barron ......................... 709/217 |
| 6,718,412 | B2 | * | 4/2004 | Purcell et al. ............... 710/109 |
| 2002/0066791 | A1 | | 6/2002 | Leydier et al. .............. 235/492 |
| 2002/0109770 | A1 | | 8/2002 | Terada ...................... 348/14.08 |
| 2002/0141418 | A1 | | 10/2002 | Ben-Dor et al. ............ 370/398 |
| 2002/0147882 | A1 | | 10/2002 | Pua et al. .................... 711/103 |
| 2002/0178304 | A1 | | 11/2002 | Camara et al. ............... 710/11 |
| 2003/0063196 | A1 | | 4/2003 | Palatov et al. ........... 348/211.2 |

FOREIGN PATENT DOCUMENTS

| EP | 0 917 064 | 5/1999 | ........... G06F/13/38 |
|---|---|---|---|
| WO | WO 99/49415 | 9/1999 | ........... G06K/19/00 |
| WO | WO 01/96990 | 12/2001 | ............. G06F/1/00 |

\* cited by examiner

*Primary Examiner*—Ahshik Kim
(74) *Attorney, Agent, or Firm*—Lisa K. Jorgenson; Christopher F. Regan

(57) ABSTRACT

An integrated circuit is used in a smart card device and includes at least one memory for storing mass storage data. The smart card device communicates through a chip/smart card interface (CCID) in accordance with the International Standards Organization 7816 (ISO 7816) protocol and a mass storage interface. A microprocessor is connected to the at least one memory and operative for initiating communications with the host using a CCID interface and transferring mass storage data using a mass storage interface.

34 Claims, 5 Drawing Sheets

SMART CARD DEVICE USED AS MASS STORAGE DEVICE

FIELD OF THE INVENTION

This invention relates to the field of smart card devices, and more particularly, this invention relates to smart card tokens used for mass storage of data.

BACKGROUND OF THE INVENTION

Smart cards are plastic cards having an embedded Integrated Circuit (IC). That IC may be a logic circuit with its associated memories or a microcontroller with its associated memories and software, or a microcontroller with its associated memories and software coupled to a custom circuit block or interface.

To use the computing power of the IC, a smart card makes use of a full set of packaging technologies. For example, the die size varies from 1 mm² to 30 mm², but is limited because of the mechanical limitations imposed by the plastic construction of the smart card. The IC is attached to a lead frame and wire-bonding techniques are used to connect the IC pads to the lead frame contacts. Potting or other strengthening methods can be used to protect the IC against chemical and mechanical stresses during manufacturing and which are a part of everyday usage of a smart card.

Eight contacts are typically located on one side of the card. The smart card performs transactions with a smart card reader using a serial protocol. The mechanical and electrical specifications for a smart card are published by the International Standard Organization (ISO) as ISO7816-X standards, which have allowed the simple and mass produced magnetic stripe cards to evolve toward the smart card. This natural evolution has allowed smart cards, depending on the IC complexity, of course, to perform pre-paid accounting, cryptographic scheme, personal authentication using a PIN code, biometrics, and java scripts, for example.

ISO documents ISO 7816-1 Physical Characteristics, ISO 7816-2 Dimensions and Locations of the contacts, ISO 7816-3 Electronic signals and transmission protocols, ISO 7816-4 Interindustry Commands for Interchange, and ISO 7816-10 Electronic signals and answer to reset for synchronous cards are incorporated herein by reference.

In operation, smart card readers are recognized by the reader infrastructure or a host computer prior to performing any transaction involving a smart card. The infrastructure runs an application involving the smart card. The half duplex protocol between the smart card and the smart card reader, in which either the smart card sends information to the smart card reader or vice versa, cannot start until a smart card is in place and detected by the smart card reader. The infrastructure manages authentication or transactions for pre-paid cards in public telephony, for Bankcards in Point-of-Sale (POS) terminals and Automatic Teller Machines (ATM), for Pay TV providers in set top boxes, and for wireless telecom operators in Subscriber Identification Modules (SIM) used in Global System for Mobile (GSM) terminals. Except for SIM cards, all other smart card reader applications use a physical sensor to detect the smart card. This sensor tells the smart card reader when a smart card is in place, i.e., when the smart card lead frame contacts mate with the smart card reader contacts.

When the smart card reader has established that a smart card is in place, a power-up sequence begins. After this power-up sequence has finished, the smart card reader typically provides a clock to the smart card and releases a reset signal. The smart card then executes its stored Operating System (OS). The SIM card, on the other hand, is in place only once with the power-off and used constantly subsequent to its positioning.

The first application for smart card technology was the public telephone system. The smart card die size was typically less than 1 mm², and only memories and logic circuits were integrated in the IC. The smart card reader used all eight contacts to interface properly with the different smart card generations. When the smart card was inserted in the payphone, the telephone infrastructure authenticated the smart card and the telephone removed accounting "units" from the smart card.

The banking industry subsequently adopted smart cards. The die size was about 10 mm², and a microcontroller and its associated memories and software were integrated in the IC. The smart card reader used up to six contacts to interface properly with the different smart card generations. When a smart card was inserted in the ATM or the POS (point-of-sale), the smart card user was authenticated with a PIN code. The smart card could store different items, such as the balance of cash received from an ATM on a per week basis or details of purchases since a last closing date. Based on this information, authorization could be issued on the spot once the PIN had authenticated the debtor. This was accomplished without telephone calls to the bank.

Another application for smart cards has been developed by GSM manufacturers. The die size in a SIM is about 30 mm², and a microcontroller and its associated memories and software are integrated in the IC. The SIM reader uses five contacts to interface properly with the smart card. The more sophisticated smart card applications are performed in GSM using Java applets.

A new market for the smart card has emerged with the growth of the internet accessed from a personal computer. Secure message, Public Key Infrastructure, Authentication and Electronic Payment are new smart card areas of interest. The smart card acts as an e-commerce facilitator. One advantage of a smart card compared to other solutions is the smart card PIN located in its memory that is never communicated in any transaction.

Presently, a smart card is inserted into a smart card reader connected to a host computer. Two protocols are involved in supporting transactions between the smart card and host computer. The first protocol complies with the ISO-7816-3, which provides detailed requirements for the serial interface between smart card and smart card reader. The reader is connected to the computer via a serial port, a parallel port, or the Universal Serial Bus (USB), using a second protocol. The smart card reader contains electronic circuits and embedded software that enable communication between the smart card using the first protocol and the host computer using the second protocol. The host computer is loaded with any appropriate drivers to support the smart card reader.

Many countries have begun to use the smart card in the PC environment. The die size used in these applications ranges from 5 mm² to 30 mm², and the microcontroller and its associated memories and software are integrated in the IC typically with a cryptocontroller. Sometimes, a bio-sensor is integrated. The smart card reader uses at least five contacts to interface properly with the smart card in these applications.

Since the late 1990's, the universal serial bus (USB) has become firmly established and has gained wide acceptance in the PC marketplace. The USB was developed in response to a need for a standard interface that extends the concept of "plug and play" to devices external to a PC. It has enabled users to install and remove external peripheral devices without opening the PC case or removing power from the PC. The USB provides a low-cost, high performance, half-duplex serial interface that is easy to use and readily expandable.

USB uses four wires. The power supply is carried with two wires (VBus and ground), and data is carried with the other two wires (D+, D−). The latest version of the USB is currently defined by the Universal Serial Bus Specification Revision 2.0, written and controlled by USB Implementers Forum, Inc., a non-profit corporation founded by the group of companies that developed the USB Specification and is incorporated herein by reference. The increasingly widespread use of the USB has led smart card reader manufacturers to develop USB interfaces for connection of their products to host computers to complement the existing serial and parallel interfaces.

Although smart cards have been found in increasingly different applications, including their use with different USB devices, the use of smart cards is limited when they are used to store large amounts of data. Smart cards typically could not download or upload large amounts of data to or from the smart card in an efficient manner. Although Universal Serial Bus (USB) mass storage devices do exist, those devices are not secured and therefore often lack any required security. Also, USB smart card devices (USD) cannot exchange a large volume of data without a customized application and driver. It is not possible to manipulate the files from a USB smart card device in any native formats, and it is often necessary to translate the format to be compatible with an application.

It has been known to use mass storage tokens that are operative with the USB format as USB mass storage tokens. These devices include a USB microcontroller and an external memory. Usually, the USB microcontroller is not secure and any data stored in the memory is not safe. Also, the actual USB smart card tokens communicate via the ISO 7816-4. As a result, there is wasted performance. The protocol is not yet a standardized requirement for installing a custom USB driver in its application. Because of a low memory size and low speed communication, ISO smart cards use the commands defined in the ISO 7816-4 requirements to transfer data, and thus, a custom application is required to transfer data.

SUMMARY OF THE INVENTION

It is therefore an object of the present invention to provide a smart card device operative as a smart card mass storage device that does not require a PC custom driver and associated application for mass storage of data.

It is another object of the present invention to provide a smart card device operative as a secure USB smart card mass storage device that works with a USB host.

The present invention advantageously overcomes the disadvantages of the prior art as noted above. An integrated circuit of the present invention includes at least one card memory for storing mass storage data. A microprocessor is connected to the at least one memory and operative for initiating communications with the host using a chip/smart card (CCID) interface in accordance with the International Standards Organization 7816 (ISO 7816) protocol and transferring mass storage data using a mass storage interface.

In accordance with one aspect of the present invention, the device is operative for calling the CCID interface and mass storage interface during the same communication session. The device is also operative for calling a first communications sessions to configure the rights of a file directory and grant file access using the CCID interface and subsequently transferring mass storage data using the mass storage interface. The device is also operative for supporting a bulk-in endpoint and bulk-out endpoint when communicating with the host using a CCID interface. The device is also operative for supporting an interrupt-in endpoint as an option.

In yet another aspect of the present invention, the device is operative for supporting a control endpoint, a bulk-in endpoint and bulk-out endpoint when communicating with the host using a mass storage interface. The device is also operative for communicating with a reduced block command (RBC) dedicated to removable media devices attached to a serial bus when communicating with the host using a mass storage interface. The device is operative for communicating with the universal serial bus of a host. The device is also operative for transferring data as typed and sub-typed standards in accordance with Multipurpose Internet Mail Extensions (MIME). The smart card device, in one aspect of the present invention, comprises a USB token.

A smart card token device is also set forth as having a token body and the integrated circuit is carried by the token body.

In a method aspect of the present invention, a method of communicating between a smart card device and host device is disclosed and comprises the step of initializing communication through a chip/smart card interface (CCID) of the smart card device in accordance with the International Standards Organization 7816 (ISO 7816) protocol and transferring mass storage data through a mass storage interface of the smart card device.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
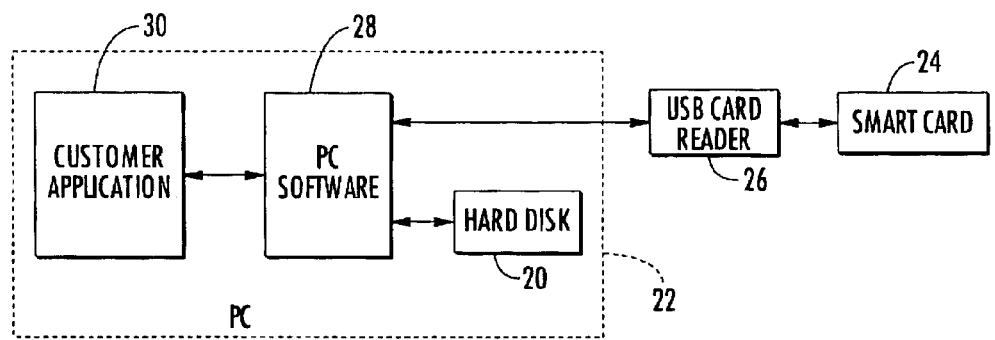
FIG. 1 is a block diagram showing a computer that has been secured using a serial smart card plugged into a USB card reader that is CCID compatible where a software program at the PC manages and drives all components.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention overcomes the disadvantages of the prior art mass storage tokens and allows a USB smart card device (USD) to define a new secure mass storage solution using a smart card and USB technology. The present invention integrates various elements including:

a) A secure smart card using a serial port;
b) A USB device;
c) A USB mass storage device; and
d) A CCID (chip/smart card interface device).

The USB mass storage class specification overview is hereby incorporated by reference in its entirety, and the device class specification for USB chip/smart card interface devices, revision 1.0, is also incorporated by reference in its entirety.

The present invention is advantageous because any computer with a USB host controller can use the smart card device operative as a USB smart card mass storage device with no specific drivers and reader. In operation, the smart card device is already integrated into the computer operating system environment and a drive letter appears in the graphical user interface. The USB smart card mass storage device is secure and is "plug and play." It can be token size and the file format can be directly available by a current application. For example, smart card files could be accessed using a STDLIB library via the USB. Also, the smart card device of the present invention can have Multipurpose Internet Mail Extensions (MIME) association for allowing e-mail data transfers.

It should be understood that a smart card device is a secure token that can contain information and provide a secure platform for various activities. USB devices allow interconnection to a PC in a relatively easy manner and permit a high speed interface. The smart card operative as a USB mass storage device of the present invention shares memory easily on any PC using a native application. The memory is seen similar to the standard memory of the PC. It is known that the Chip/Smart Card Interface Device (CCID) class describes USB smart card reader features. Every USB smart card reader is CCID compatible and could use the CCID driver implemented in the operating system PC and thus be PC and smart card (PC/SC) compatible. The integrated secure smart card of the present invention integrates four components of the serial port, a USB device, a USB mass storage device, and the CCID device. These functions and devices are integrated into the same integrated circuit chip rather than implemented in front of various components. The components are tied together through a protocol.

FIG. 1 shows a current application, which is not secure. In that unsecure application, the hard disk 20 and PC 22 are operable with a serial smart card 24 plugged into a USB card reader 26 (CCID compatible). A software 28 program in the PC manages and drives the components together with the customer software application 30. In the present invention, on the other hand, packaging the various elements are embedded within a monolithic structure. It is difficult for an observer to intercept information passing between the components. As a result, there is no requirement of extra PC software and the system is portable and easy to use in a native environment.

Figure 2:
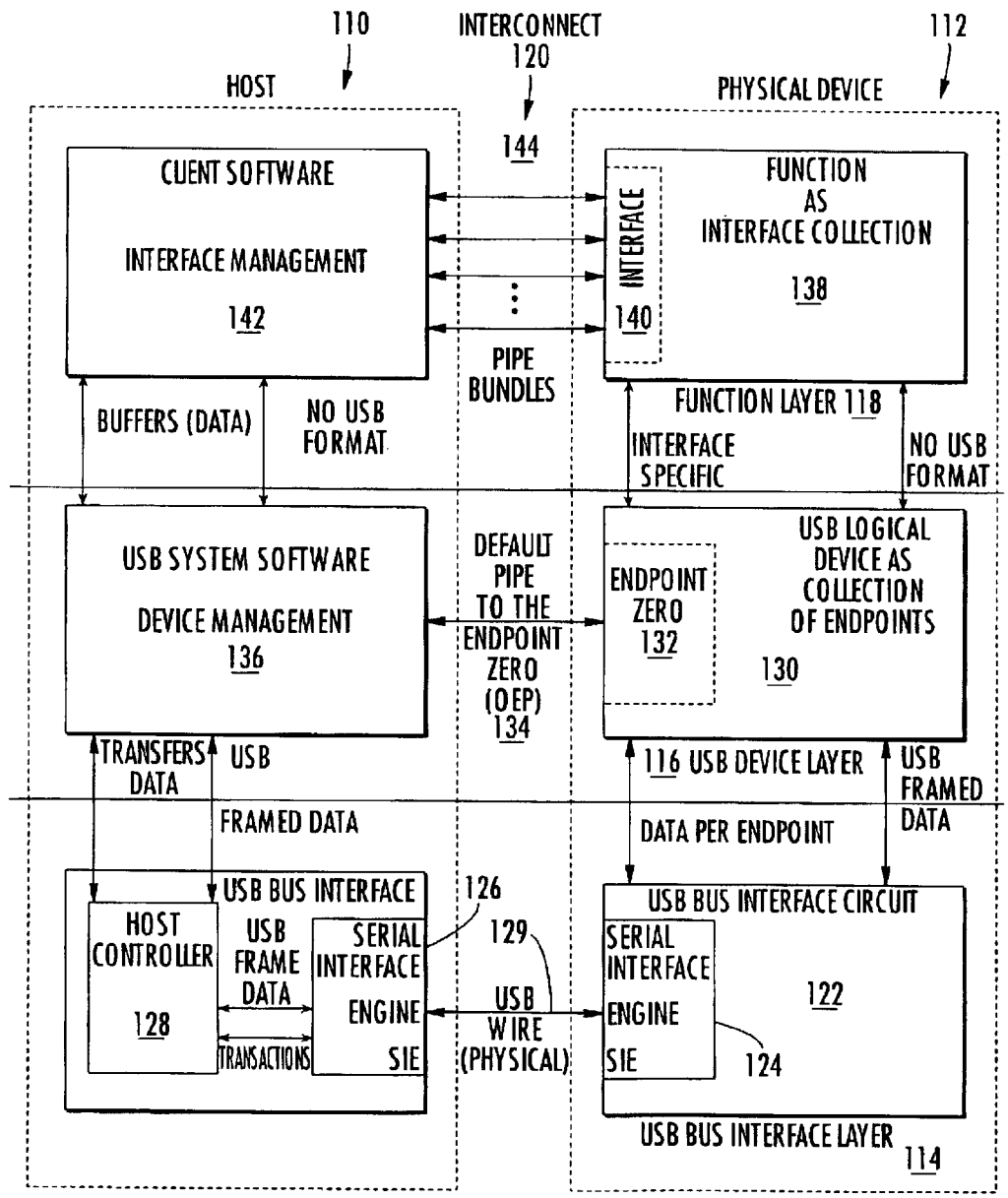
FIG. 2 is a block diagram of a USB showing the different data transport mechanisms, pipes and a USB-relevant format of transported data between the host and interconnective physical device as taught in the universal serial bus specification revision 2.0.

For purposes of background and description, the basic USB data flow between a USB host and a USB device and the various implementations and layers in accordance with the universal serial bus specification 2.0 are set forth in FIG. 2.

As shown in FIG. 2, the connection of a host 110 to a physical device 112 requires the interaction between different layers, i.e., the USB bus interface layer 114, USB device layer 116, and function layer 118. An interconnect 120 between the host and device is illustrated.

The USB bus interface layer 114 includes a USB bus interface circuit 122 and serial interface engine (SIE) 124 at the device 112 that communicates with a serial interface engine (SIE) 126 and its host controller 128 at the host 110 via a physical wire 129. The USB device layer 116 includes at the physical device 112 a collection of endpoints as a USB logical device 130. An endpoint zero 132 is operable in communication via the default pipe 134 to USB system software 136 that is operable for device management at the host 110. The function layer 118 includes at the physical device 112, a logical function 138 as an interface collection, and the interface 140 that communicates via a plurality of pipe bundles 144 to client software 142 that is operable for interface management.

The USB bus interface layer 114 provides the physical wire 129 for the traffic signaling and packet conductivity between the host 110 and physical device 112. The USB device layer 116 views the USB system software 136 to perform generic USB operations with the physical device 112 via the default pipe 134 to endpoint zero 132. The functional layer 118 adds capabilities to the host using matched client software. The USB Device Layer 116 and Function Layer 118 each view logical communications within their layers and use the USB Bus Interface Layer 114 for any data transfer. The USB host 110 coordinates the overall USB system, controls access, and monitors the USB topology.

Logical communications exist between the client software and the Function Layer 118 and the USB system software 136 and USB logical device 130. Actual packets flow between the USB host controller 128 and the USB bus interface circuit 122.

As is known, USB physical devices add functionality to the host and have the same interface. Each physical device carries and reports configuration-related data, which it forwards to the host to allow the host to identify and configure the USB device. Typically, devices on the USB are connected to a host using a tiered star topology, including the hub. The host, on the other hand, communicates with each logical device as if it were directly connected to a root port. The client software manipulates a USB function interface of a device only as an interface of interest.

It should be understood that the actual communication flows across several interface boundaries. The two software interfaces for the host are a host controller driver (HCD) and a USB driver (USBD). A software interface between a USB host controller 178 and USB system software 176 implements the host controller driver and allows the host controller to implement functions without requiring the host software to be dependent on any particular implementation. One USB driver can support different host controllers. Specific knowledge of a host controller implementation is not required.

The USB logical device 130 can be considered a collection of endpoints and are grouped into endpoint sets to implement the interface. The USB system software 136 manages or controls the device using the default pipe 134 to the endpoint zero 132. Client software 142 manages the interface using pipe bundles 144 associated with an endpoint set. Data is moved between a buffer on the host 110 and an endpoint on the USB device 112 when client software requests the data. The host controller 128 or USB device 112, depending on the direction of data transfer, packetizes the data and forwards the packets over the bus. It also coordinates bus access. The host communicates with the physical device using a desired communication that is designed to match any communication requirements of the physical device and transfer characteristics provided by a USB.

The endpoint is an identifiable portion of the device that terminates the communication between the host. It can be a collection of independent endpoints. Default control uses input and output endpoints and the endpoint number "zero" as part of the default pipe 134.

The data transport mechanism includes transfers of data between the host controller 128 and the USB system software 136 at the host 110. Buffers can be used as a data transport mechanism between the USB system software 136 and the client software 142 at the host 110. The other data transport mechanism includes transactions between the host controller 128 and the serial interface engine 126 within the USB bus interface of the host.

The data transport mechanism also exists as a data per endpoint between the USB bus interface circuit 122 and the USB logical device 130 at the physical device 112. The data transport mechanism between the function 138 (and with the interface 140) and the endpoint zero 132 is interface-specific.

USB-relevant format of transported data occurs as USB frame data between the serial interface engine 126 and the host controller 128 and between the host controller 128 and the USB system software 136 at the host 110. No USB format for transporting data exists between the client software 142 that manages an interface and the USB system software 136.

At the device 112, USB-relevant format of transported data exists as USB frame data between the USB bus interface circuit 122 and the USB logical device 130. No USB format of data occurs between the interface 140 and the endpoint zero 32 at the device 112.

Further details of the functioning of the USB host and device and data flow can be found in the Universal Serial Bus Specification Revision 2.0, including Chapter 5 entitled "USB Dataflow Model," the disclosure for the entire Specification Revision 2.0 which is hereby incorporated by reference in its entirety.

Many smart card devices are full speed USB compliant. Unfortunately, there is no approved standard for a software application or other device to communicate with a USB smart card. Typically, each USB smart card device uses its own protocol communication and proprietary PC USB driver. By modifying the hardware of the USB smart card device and the embedded code, it is possible to allow the smart card device to become CCID USB device class compatible, eliminating the necessity of maintaining a proprietary solution.

The CCID USB device class is compliant with a personal computer and smart card environment. Thus, the USB smart card mass storage device of the present invention integrates into the computer operating system environment without modification and can communicate with any host smart card program that is PC and smart card (PC/SC) compliant.

In the present invention, a host smart card program would accomplish two tasks before it begins to transfer data with the smart card device. It would ensure that the smart card device to communicate with is authentic. The host would also convince the smart card device that it is authentic. No transfers would be conducted before this mutual trust has been established through appropriate handshaking and verification.

Figure 3:
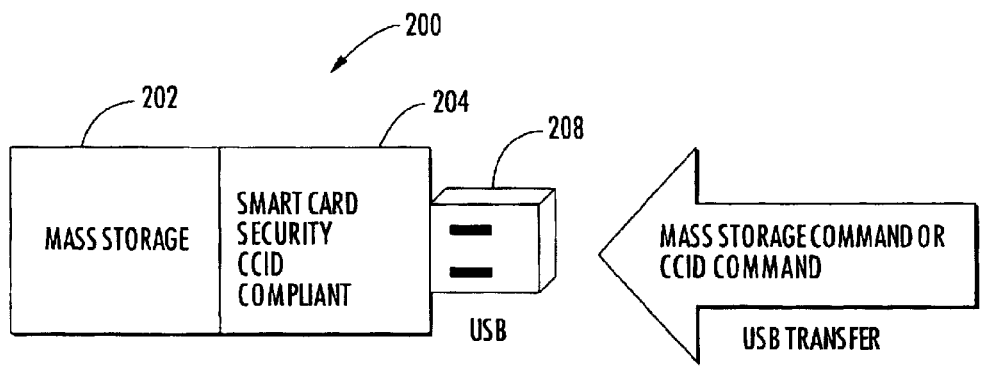
FIG. 3 is a block diagram showing a smart card that is USB compliant and has mass storage and smart card security.

Recent smart card devices also tend to include greater amounts of memory. Unfortunately, the PC and smart card architecture, and ISO 7816 protocol, are not designed to transfer large amounts of data in an efficient manner. Thus, the present invention targets a composite USB device with two interfaces, i.e., the CCID interface and the mass storage interface, as shown in FIG. 3. The smart card device 200 is shown as a preferred USB mass storage token and includes mass storage functionality 202 and smart card security for CCID compliant data 204. The USB port 208 can receive mass storage commands or CCID commands as part of a USB transfer. The mass storage class is dedicated to transferring data in an efficient manner and uses the native architecture of the PC operating system. No extra software is required and it is possible to use the current applications to access the secure mass storage memory.

Figure 4:
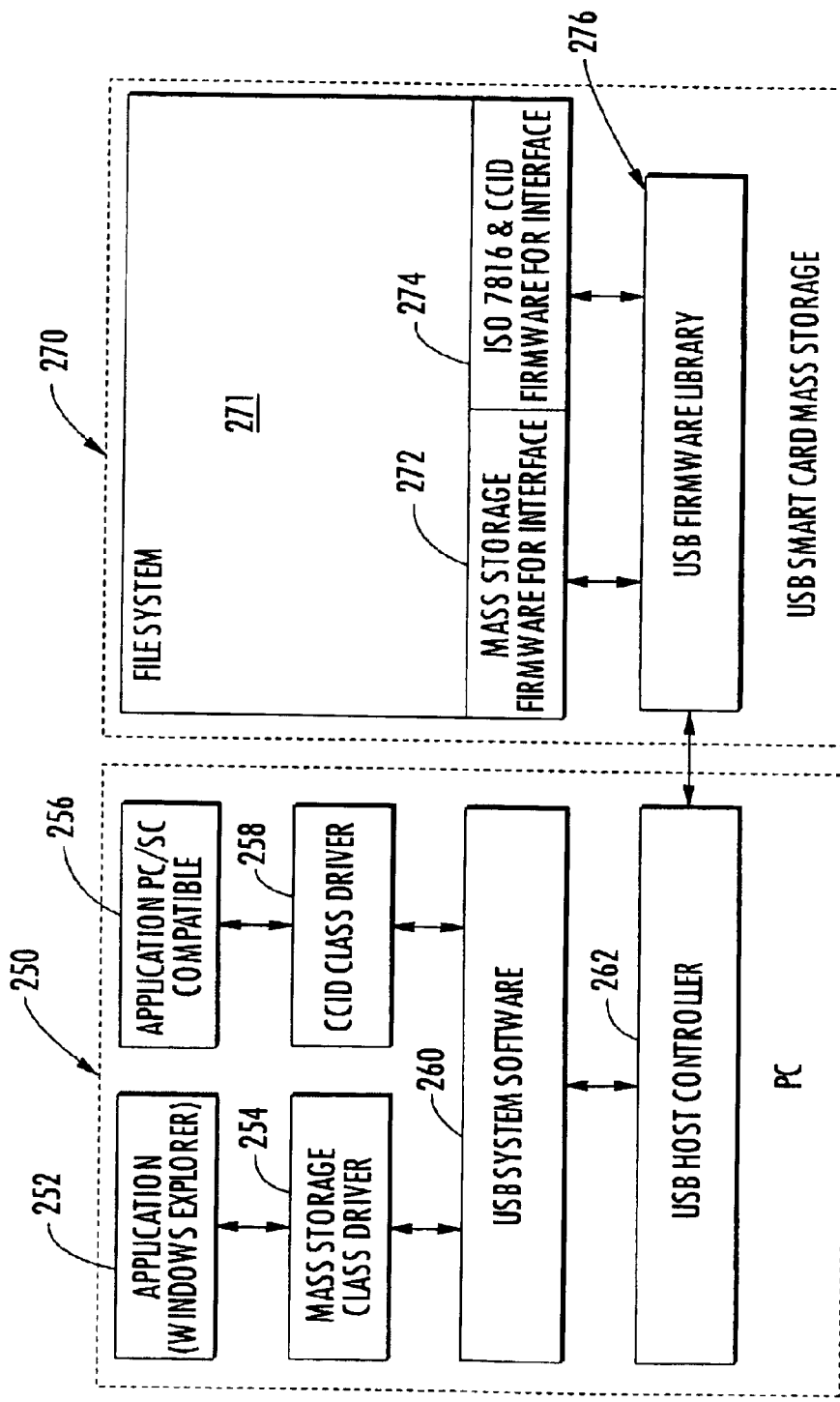
FIG. 4 is a block diagram of a PC and USB smart card having mass storage capabilities and showing different logical and physical components in accordance with the present invention.

The present invention uses two USB classes. The smart card device of the present invention is compatible with the USB mass storage class and the CCID class. Thus, the smart card device of the present invention has two interfaces, i.e., the USB mass storage interface and the CCID interface as shown in FIG. 4. As illustrated, a personal computer 250 is operative as a host and includes the application software 252, such as Windows Explorer, operative with the mass storage class driver 254, and an application 256 that is PC and smart card compatible and operative with the CCID class driver 258. The USB system software 260 is operative with both the mass storage class driver 254 and the CCID class driver 258. The USB host controller 262 is operative with USB system software 260.

The smart card device 270 is operative as a USB smart card mass storage device of the present invention and includes a file system 271 with mass storage firmware 272 and the ISO 7816 protocol and CCID protocol firmware 274, both operative with the USB firmware library 276.

In the present invention, both interfaces of the smart card device could be called during the same session, or a first session could configure the rights of the directory and files that will be accessed using the CCID interface. Only granted files would be accessible through a Windows application using the mass storage interface.

The CCID interface permits management of data and access for the smart card device. The smart card device as a secure USB mass storage token of the present invention supports the ISO 7816 command using the CCID interface. Any personal computer and smart card compliant application can communicate with the CCID class compatible device.

Figure 5:
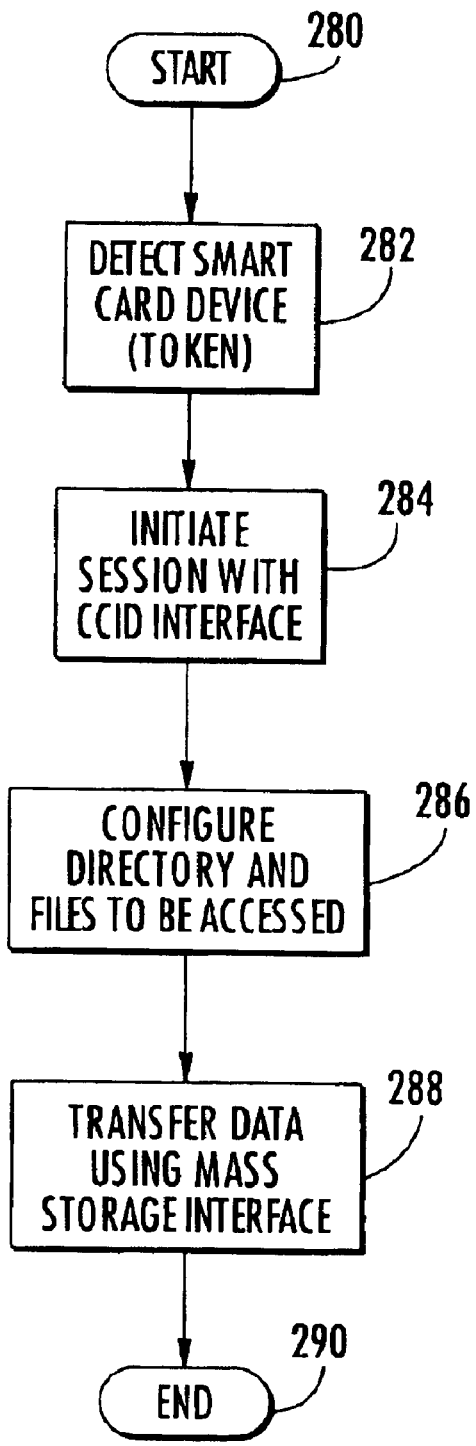
FIG. 5 is a high level flow chart showing a basic method of operation of the present invention.

FIG. 5 illustrates a high level flow chart of one example for the method of the present invention that starts (block 280) such as by inserting the token into a USB port of a computer. The smart card device of the present invention is detected (block 282). A first session is initiated with the CCID interface (block 284) and the directories are configured and files to be accessed are identified (block 286). Mass storage data is transferred using the mass storage interface (block 288) and after mass storage data transfer, the process ends (block 290).

The preferred secure USB mass storage device of the present invention supports a bulk-in endpoint, a bulk-out endpoint, and optionally, an interrupt-in endpoint. Naturally, the smart card supports the default control endpoint. A minimal two endpoints are supported in addition to the default (control) endpoint. The CCID class could report insertion of the card or removal when the interrupt-in endpoint is supported. It should be understood that the bulk-out endpoint sends commands and transfers data from the host device. The bulk-in endpoint sends responses and transfers data from the device to the host, and replies to commands received from the command pipe. An event report pipe could be used by the CCID class firmware to notify the host of an integrated circuit chip (ICC) insertion event, a chip removal, event or hardware errors.

As to the USB mass storage interface, it permits the integration of the device into the operating system and allows the transfer of large amounts of data in an efficient manner. The interface and its functionality can call the smart card during the personal computer boot. The device of the present invention also supports different USB descriptors, including a bulk only transport protocol, and supports a control endpoint, bulk-in endpoint, and bulk-out endpoint. The device supplies a unique serial number for identification and is operative for transferring data as typed and sub-typed standards in accordance with Multipurpose Internet Mail Extensions. Thus, e-mail data can be transferred.

It should be understood that bulk transfers are used for large bursty data and can include error detection via a cyclic redundancy check. The bulk-in transaction occurs when the host is ready to receive bulk data and issues an IN token. If the IN token is received with an error, the packet is ignored. If a token was received correctly, the function can reply with a data packet containing any bulk data to be sent. A STALL packet indicates the endpoint includes an error. A NAK packet indicates the endpoint is working, but no data is to be sent.

In an OUT transaction, the host sends the function a bulk data packet and issues an OUT token followed by a data packet containing the bulk data. When the OUT token or data packet is corrupt, the function ignores the packet. If a function's endpoint buffer is empty and has clocked data into the endpoint buffer, the function could issue an ACK that it has received the data and inform the host of this event. If the endpoint buffer is not empty because it is processing a previous packet, the function could return a NAK. If the endpoint had an error and the half bit has been set, it could return a stall.

When a pipe is requested with a bulk transfer, the USB is accessed on a bandwidth available basis and no retry of transfers and guaranteed delivery of data (no guaranty of bandwidth or latency). The device of the present invention supports standard USB descriptors, such as the device descriptor configuration descriptor, interface descriptors and endpoint descriptors. It also supports string descriptors for the supply of a unique serial number. The bulk-only data interface typically uses three endpoints, i.e., the control for endpoint zero, the bulk-in and bulk-out, as described before. The industry standard command block definition recommended for data transfer in the present invention is the Reduced Block Commands (RBC) dedicated to removable medial devices attached to a serial bus.

Figure 6:
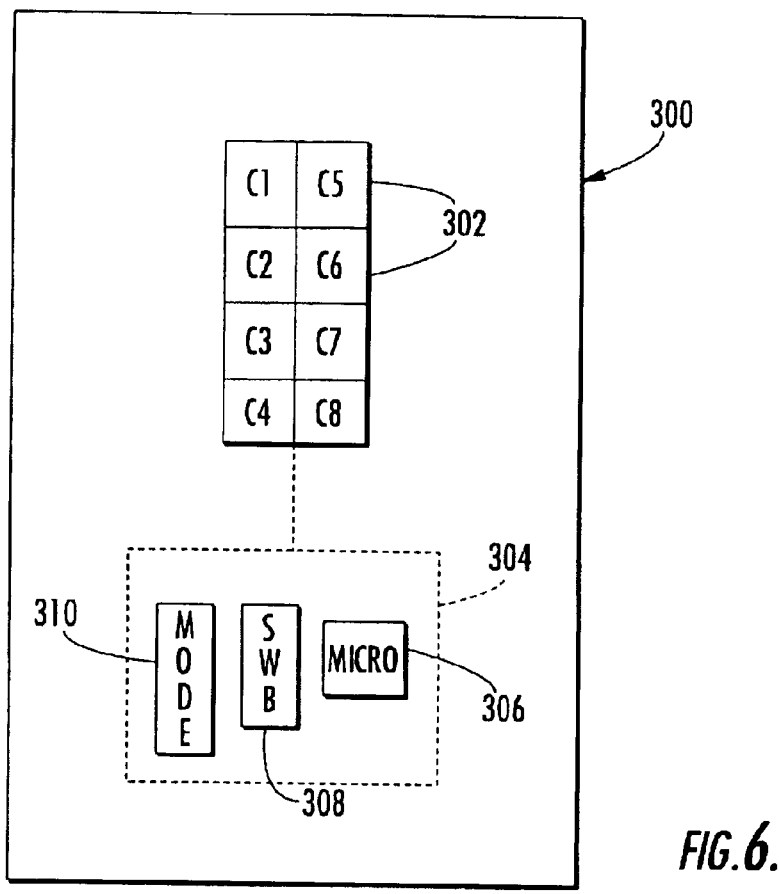
FIG. 6 is a block diagram of a smart card that can be used in the present invention.

Many different types of smart card devices can be used in the present invention, including smart card tokens. One type of smart card device that can be used or modified for use with the present invention is disclosed in U.S. Pat. No. 6,439,464 to Fruhauf et al., the disclosure which is hereby incorporated by reference in its entirety. As shown in FIG. 6, the smart card device 300 is typically made of plastic and includes a plurality of electrical contacts or pads 302 that are positioned on the outer surface. For example, eight contacts or pads (C1 through C8) could be used. The pads are an external interface for the integrated circuit (IC) 304, which is embedded within the card and typically beneath the pads. The size of the card and position of the pads are usually determined by appropriate standards, such as ISO 7816 protocol. Naturally, the IC can be embedded in other media such as a subscriber identity module (SIM) used with module phones, tokens or other wireless USB devices.

It should be understood that the integrated circuit (IC) can be a dual-mode IC that includes a microprocessor 306, a switching block 308, mode configuration circuit 310, and the external interface formed by the contacts 302 (C1 through C8). These contacts could include a voltage supply pad VCC, a reference voltage/ground pad GND, a first set of pads for an ISO mode and a second set of pads for a non-ISO mode, such as a USB mode. This first set of pads can include a reset pad RST, a clock pad CLK, and an input/output I/O pad in accordance with the ISO 7816 protocol. A second set of pads could include a D+ pad, DP and a D− pad DM in accordance with a USB protocol.

A dual mode IC could be capable of operating in a first mode, such as the ISO mode, in accordance with the International Standard Organization 7816 (ISO 7816) protocol and a second non-ISO mode such as the USB mode in accordance with the Universal Serial Bus (USB) protocol as noted before. A dual-mode IC could operate selectively in one mode or the other, but typically not both modes simultaneously. A dual-mode smart card device could include, for example, mode detection circuits, USB voltage detector, latching circuits, control registers, delay blocks, pull up resistors, and other configuration and control circuits as set forth in the incorporated by reference '464 patent.

Figure 7:
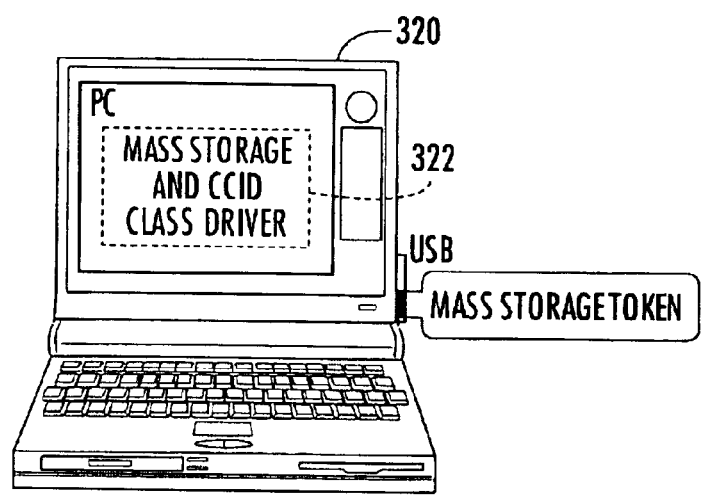
FIG. 7 is a block diagram of a personal computer and showing a smart card token device of the present invention inserted in a USB port, wherein the personal computer includes a mass storage class driver and CCID class driver.

As shown in FIG. 7, a personal computer 320 would have a mass storage and CCID class driver 322 as described before. The central processing unit of the computer is operative with various input/output devices, such as the monitor, keyboard and mouse. A USB port 324 in the computer receives the smart card device as a token.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. An integrated circuit comprising:
at least one memory for storing mass storage data; and
a microprocessor connected to the at least one memory and operative for initiating communications with a host using a chip/smart card (CCID) interface in accordance with the International Standards Organization 7816 protocol and transferring mass storage data using a USB mass storage interface in accordance with the USB mass storage class specification, and including a USB firmware library and a file system having both mass storage and ISO/CCID protocol firmware, both operative with said USB firmware library, wherein a first session configures rights of files that will be accessed using the CCID interface and only granted files are accessible through a host application using the mass storage interface, wherein said microprocessor is operative for supporting control, bulk-in and bulk-out endpoints and bulk-only transport protocol.

2. An integrated circuit according to claim 1, wherein said microprocessor is operative for calling the CCID interface and mass storage interface during a communications session.

3. An integrated circuit according to claim 1, wherein said microprocessor is operative for supporting a bulk-in endpoint and bulk-out endpoint when communicating with a host using a CCID interface.

4. An integrated circuit according to claim 3, wherein said microprocessor is operative for supporting an interrupt-in endpoint.

5. An integrated circuit according to claim 1, wherein said microprocessor is operative for communicating with a Reduced Block Command (RBC) dedicated to removable media devices attached to a serial bus when communicating with a host using a mass storage interface.

6. An integrated circuit according to claim 1, wherein said microprocessor is operative for communicating with a universal serial bus port of a host.

7. An integrated circuit according to claim 1, wherein said microprocessor is operative for transferring mass storage data as typed and sub-typed standards in accordance with Multipurpose Internet Mail Extensions.

8. An integrated circuit according to claim 1, wherein said microprocessor is operative for communicating with a host as a USB token device.

9. A smart card device comprising:
a token body; and
an integrated circuit carried by said token body and comprising
at least one memory for storing mass storage data; and
a microprocessor connected to the at least one memory and operative for initiating communications with a host using a chip/smart card (CCID) interface in accordance with the International Standards Organization 7816 protocol and transferring mass storage data using a USB mass storage interface in accordance with the USB mass storage class specification, and including a USB firmware library and a file system having both mass storage and ISO/CCID protocol firmware, both operative with said USB firmware library, wherein a first session configures rights of files that will be accessed using the CCID interface and only granted files are accessible through a host application using the mass storage interface, wherein said microprocessor is operative for supporting control, bulk-in and bulk-out endpoints and bulk-only transport protocol.

10. A smart card device according to claim 9, wherein said microprocessor is operative for calling the CCID interface and mass storage interface during a communications session.

11. A smart card device according to claim 9, wherein said microprocessor is operative for supporting a bulk-in endpoint and bulk-out endpoint when communicating with a host using a CCID interface.

12. A smart card device according to claim 11, wherein said microprocessor is operative for supporting an interrupt-in endpoint.

13. A smart card device according to claim 9, wherein said microprocessor is operative for communicating with a Reduced Block Command (RBC) dedicated to removable media devices attached to a serial bus when communicating with a host using a mass storage interface.

14. A smart card device according to claim 9, wherein said microprocessor is operative for communicating with a universal serial bus port of a host.

15. A smart card device according to claim 9, wherein said microprocessor is operative for transferring mass storage data as typed and sub-typed standards in accordance with Multipurpose Internet Mail Extensions.

16. A smart card device according to claim 9, wherein said token body includes a USB communications port operable with a USB port of a host.

17. A smart card system comprising:
a host having a communications port;
a smart card token device having a communications port operable with the communications port of the host, and comprising a processor for communicating with said host using a chip/smart card interface (CCID) in accordance with the International Standards Organization 7816 (ISO 7816) protocol for initiating communications and a USB mass storage interface for transferring mass storage data in accordance with the USB mass storage class specification, and including a USB firmware library and a file system having both mass storage and ISO/CCID protocol firmware, both operative with said USB firmware library, wherein a first session configures rights of files that will be accessed using the CCID interface and only granted files are accessible through a host application using the mass storage interface, wherein said microprocessor is operative for supporting control, bulk-in and bulk-out endpoints and bulk-only transport protocol.

18. A smart card system according to claim 17, wherein said host comprises a mass storage class driver and CCID class driver operative for transferring mass storage data with said smart card token device using the CCID and mass storage interfaces.

19. A smart card system according to claim 17, wherein said processor is operative for calling the CCID interface and mass storage interface during a communications session.

20. A smart card system according to claim 17, wherein said processor is operative for calling a first communications session to configure the rights of a file directory and grant file access using the CCID interface and subsequently transferring mass storage data using the mass storage interface.

21. A smart card system according to claim 20, wherein said processor is operative for supporting a bulk-in endpoint and bulk-out endpoint for communicating with a host using a CCID interface.

22. A smart card system according to claim 21, wherein said processor is operative for supporting an interrupt-in endpoint.

23. A smart card system according to claim 17, wherein said processor is operative for communicating with a Reduced Block Command (RBC) dedicated to removable media devices attached to a serial bus.

24. A smart card system according to claim 17, wherein said processor is operative for communicating with a universal serial bus port of a host.

25. A smart card system according to claim 17, wherein said processor is operative for transferring mass storage data as typed and sub-typed standards in accordance with Multipurpose Internet Mail Extensions.

26. A smart card system according to claim 17, wherein said smart card token device comprises a USB token.

27. A method of communicating between a smart card device and host comprising the step of initializing communication through a chip/smart card interface (CCID) of the smart card device in accordance with the International Standards Organization 7816 (ISO 7816) protocol and transferring data through a USB mass storage interface of the smart card device in accordance with the USB mass storage class specification, and including a USB firmware library and a file system having both mass storage and ISO/CCID protocol firmware, both operative with said USB firmware library, wherein a first session configures rights of files that will be accessed using the CCID interface and only granted files are accessible through a host application using the mass storage interface, wherein said microprocessor is operative for supporting control, bulk-in and bulk-out endpoints and bulk-only transport protocol.

28. A method according to claim 27, and further comprising the step of calling the CCID interface and mass storage interface during the same communications session.

29. A method according to claim 27, and further comprising the step of calling a first communications session to configure the rights of a file directory and granting file access using the CCID interface and subsequently transferring mass storage data using the mass storage interface.

30. A method according to claim 27, and further comprising the step of configuring a bulk-in endpoint and bulk-out endpoint for communicating with a host using the CCID interface.

31. A method according to claim 30, and further comprising the step of configuring an interrupt-in endpoint.

32. A method according to claim 27, and further comprising the step of communicating with a Reduced Block Command (RBC).

33. A method according to claim 27, and further comprising the step of communicating with a Universal Serial Bus port of the host.

34. A method according to claim 27, and further comprising the step of transferring mass storage data as typed and sub-typed standards in accordance with the Multipurpose Internet Mail Extensions.

* * * * *

UNITED STATES PATENT AND TRADEMARK OFFICE
CERTIFICATE OF CORRECTION

PATENT NO.       : 6,945,454 B2                                    Page 1 of 1
APPLICATION NO.  : 10/420582
DATED            : September 20, 2005
INVENTOR(S)      : Tournemille et al.

It is certified that error appears in the above-identified patent and that said Letters Patent is hereby corrected as shown below:

Column 12, Line 47    Delete: "for"
                      Insert: -- when --

Signed and Sealed this

Sixth Day of February, 2007

JON W. DUDAS
*Director of the United States Patent and Trademark Office*